(12) United States Patent
Kobayashi et al.

(10) Patent No.: US 8,487,052 B2
(45) Date of Patent: Jul. 16, 2013

(54) RESIN COMPOSITION FOR FIBER-REINFORCED COMPOSITE MATERIAL, CURED PRODUCT THEREOF, FIBER-REINFORCED COMPOSITE MATERIAL, MOLDING OF FIBER-REINFORCED RESIN, AND PROCESS FOR PRODUCTION THEREOF

(75) Inventors: Atsuko Kobayashi, Ichihara (JP); Ichirou Ogura, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/389,692

(22) PCT Filed: Aug. 6, 2010

(86) PCT No.: PCT/JP2010/063369
§ 371 (c)(1), (2), (4) Date: Jun. 19, 2012

(87) PCT Pub. No.: WO2011/021516
PCT Pub. Date: Feb. 24, 2011

(65) Prior Publication Data
US 2012/0252930 A1    Oct. 4, 2012

(30) Foreign Application Priority Data
Aug. 17, 2009   (JP) .................................. 2009-188469

(51) Int. Cl.
*C08L 63/10* (2006.01)
*B32B 27/04* (2006.01)

(52) U.S. Cl.
USPC ........... 525/531; 428/413; 525/502; 525/530; 525/532

(58) Field of Classification Search
None
See application file for complete search history.

(56) References Cited

U.S. PATENT DOCUMENTS

| | | | |
|---|---|---|---|
| 3,940,537 A * | 2/1976 | Burns | 442/173 |
| 4,410,680 A * | 10/1983 | Brownscombe et al. | 528/88 |
| 5,612,424 A * | 3/1997 | Sato et al. | 525/530 |

FOREIGN PATENT DOCUMENTS

| | | | |
|---|---|---|---|
| JP | 55-110115 A | | 8/1980 |
| JP | 03-103446 A | | 4/1991 |
| JP | 2000-313750 A | | 11/2000 |
| JP | 2003-025347 A | | 1/2003 |
| JP | 2003-105109 A | | 4/2003 |
| JP | 2006-265434 A | | 10/2006 |
| JP | 2010-24315 A | * | 2/2010 |
| JP | 2010-024315 A | | 2/2010 |
| JP | 2010-024316 A | | 2/2010 |
| JP | 2010-070605 A | | 4/2010 |
| JP | 2010-70605 A | * | 4/2010 |
| JP | 2010-195886 A | | 9/2010 |
| JP | 2010-196017 A | | 9/2010 |
| JP | 2010-202790 A | | 9/2010 |
| JP | 2010-229218 A | | 10/2010 |
| JP | 2010-229311 A | | 10/2010 |

OTHER PUBLICATIONS

DIC Corporation, Epiclon Standard Products: Epoxy Resins & Curing Agents, Aug. 2011, pp. 1, 2, 7, 12 and 13.*
International Search Report dated Nov. 16, 2010, issued for PCT/JP2010/063369.

* cited by examiner

*Primary Examiner* — Robert Sellers
(74) *Attorney, Agent, or Firm* — Edwards Wildman Palmer LLP

(57) ABSTRACT

The present invention provides a resin composition for a fiber-reinforced composite material, which has excellent fluidity and impregnation into a fiber base material and which produces a cured product having excellent heat resistance. A resin composition for a fiber-reinforced composite material contains, as essential components, a poly(glycidyloxyaryl) compound (A), a polymerizable monomer (B) which is an unsaturated carboxylic acid or an anhydride thereof and has a molecular weight of 160 or less, an aromatic vinyl compound or a (meth)acrylate (C), and a radical polymerization initiator (D), wherein an equivalent ratio [glycidyloxy group/acid group] of a glycidyloxy group in the component (A) to an acid group in the component (B) is 1/1 to 1/0.48, and a molar ratio [(B)/(C)] of the component (B) to the component (C) is in the range of 1/0.55 to 1/2.

8 Claims, No Drawings

RESIN COMPOSITION FOR FIBER-REINFORCED COMPOSITE MATERIAL, CURED PRODUCT THEREOF, FIBER-REINFORCED COMPOSITE MATERIAL, MOLDING OF FIBER-REINFORCED RESIN, AND PROCESS FOR PRODUCTION THEREOF

TECHNICAL FIELD

The present invention relates to a fiber-reinforced composite material suitable for aircraft members, spacecraft members, automobile members, and the like because they exhibit excellent fluidity and produce cured products having excellent heat resistance and mechanical strength, a method for producing the materials, and matrix resin materials of the fiber-reinforce composite materials.

BACKGROUND ART

In view of excellent physical properties such as high heat resistance, moisture proof, dimensional stability, etc., epoxy resin compositions each containing an epoxy resin and a curing agent therefor as essential components are widely used for electronic components such as a semiconductor encapsulate, a printed circuit board, a build-up substrate, and resist ink, a conductive adhesive such as a conductive paste and other adhesives, a liquid sealing material such as an underfill, a liquid crystal sealing material, a cover lay for a flexible substrate, an adhesive film for build up, a coating material, a photoresist material, a color developing material, a fiber-reinforced composite material, and the like.

Among these, particularly, fiber-reinforced resin moldings produced by impregnating reinforcing fibers with an epoxy resin and a curing agent as matrix components and then curing the resin are highly required in general industrial fields such as automobile industry and aerospace industry from the viewpoint of various excellent performances such as high heat resistance, strength, low curing contraction percentage, chemical resistance, high elastic modulus, etc. in addition to properties such as light weight and high strength.

However, epoxy resins are generally high-viscosity fluids or solids at normal temperature, and thus in a step of impregnating fiber reinforcements with the resins, it is necessary to heat resin components in order to secure a practical level of fluidity of the epoxy resins, thereby causing the problem of accelerating curing of the epoxy resins by heating and rather bringing about higher viscosity and impregnation failure. In particular, in a molding technique by a resin transfer molding (RTM) method which has recently been being popularized in the field of carbon fiber-reinforced thermosetting plastics (CFRP) because of the overwhelming cycle time and low equipment cost, low viscosity and high fluidity are important problems for thermosetting resin materials from the viewpoint of higher-cycle molding.

As means for improving fluidity of an epoxy resin material for a CFRP matrix, there has been known a technique of preparing a liquid composition by mixing an aliphatic epoxy compound such as 3,4-epoxycyclohexymethyl-3,4-epoxycyclohexane carboxylate or polyglycidylamine such as N,N,N', N'-tetraglycidyldiaminodiphenylmethane with acrylic acid, styrene, and a radical polymerization initiator, impregnating a carbon fiber substrate with the liquid composition, and then effecting reaction between epoxy groups and acrylic acid and radical polymerization by heating, producing a molded product (refer to PTL 1 below).

However, when the aliphatic epoxy compound is used for the liquid composition described in PTL 1, a cured product become brittle and thus does not exhibit satisfactory strength, while when the polyglycidylamine is used, heat resistance is not satisfactorily exhibited. In addition, the epoxy resin is a special epoxy resin having excellent curability with acrylic acid and is difficult to produce on an industrial scale and is lack of practicability.

On the other hand, there has been known a technique for improving CFRP productivity by the RTM method, in which as an epoxy resin material suitable for the RTM method for CFRP application, a bisphenol F epoxy resin having an epoxy equivalent of, for example, 200 g/eq. or less, is used as a base resin, and aromatic polyamine, which is liquid at room temperature, and a complex of a Lewis acid and a base are used as curing agent components, thereby improving fluidity of a thermosetting resin component and further improving low-temperature curability (refer to PTL 2).

However, in the thermosetting resin material containing the bisphenol F epoxy resin having an epoxy equivalent of 200 g/eq. or less, the aromatic polyamine which is liquid at room temperature, and the complex of a Lewis acid and a base, the viscosity of the epoxy resin is decreased, but the viscosity of the whole composition is still high, thereby necessitating heating at about 100° C. for resin injection in, for example, RTM molding. Therefore, the possibility of thickening by curing reaction remains, the running cost is increased in terms of energy, and the molding cycle time cannot be sufficiently shortened. In addition, a cured product has unsatisfactory heat resistance and has difficulty in applying to the automobile industry and the aerospace industry.

CITATION LIST

Patent Literature

PTL 1: Japanese Unexamined Patent Application Publication No. 55-110115
PTL 2: Japanese Unexamined Patent Application Publication No. 2006-265434

SUMMARY OF INVENTION

Technical Problem

Accordingly, a problem to be solved by the invention is to provide a resin composition for a fiber-reinforced composite material which has excellent fluidity and the excellent impregnation in a fiber base material and which imparts excellent heat resistance and strength to a cured product, a cured product thereof, a fiber-reinforced composite material which imparts excellent heat resistance to a molding, a fiber-reinforced resin molding having excellent heat resistance and strength, and a method for producing the fiber-reinforced resin molding with high productivity.

Solution to Problem

As a result of intensive research for solving the problem, the inventors found that as a thermosetting resin component to be impregnated in a fiber reinforcement and cured, a composition containing a poly(glycidyloxyaryl) compound (A), a polymerizable monomer (B) which is an unsaturated carboxylic acid or an anhydride thereof and has a molecular weight of 160 or less, an aromatic vinyl compound or a (meth)acrylate (C), and a radical polymerization initiator (D) is used, in which an equivalent ratio [glycidyloxy group/acid group] of a glycidyloxy group in the component (A) to an acid group in the component (B) is 1/1 to 1/0.48, and a molar ratio [(B)/(C)] of the component (B) to the component (C) is in the range of 1/0.55 to 1/2, and the composition is continuously or simultaneously cured by so-called in-situ polymerization reaction, to react the acid group in the acid group-containing polymerizable monomer (B) with the glycidyloxy group in the poly(glycidyloxyaryl) compound (A) and to polymerize a radical polymerizable group caused by the acid group-containing polymerizable monomer (B), so that excellent fluidity is exhibited before curing even in a low-temperature region, for example, normal temperature of 25° C., excellent heat resistance is exhibited after curing, and strength comparable to conventional epoxy resin cured products is exhibited, leading to the completion of the present invention.

That is, the present invention relates to a resin composition for a fiber-reinforced composite material, the resin composition containing, as essential components, a poly(glycidyloxyaryl) compound (A), a polymerizable monomer (B) which is an unsaturated carboxylic acid or an anhydride thereof and has a molecular weight of 160 or less, an aromatic vinyl compound or a (meth)acrylate (C), and a radical polymerization initiator (D), in which an equivalent ratio [glycidyloxy group/acid group] of a glycidyloxy group in the component (A) to an acid group in the component (B) is 1/1 to 1/0.48, and a molar ratio [(B)/(C)] of the component (B) to the component (C) is in the range of 1/0.55 to 1/2.

The present invention further relates to a cured product produced by in-situ polymerization reaction of the resin composition for a fiber-reinforced composite material.

The present invention further relates to a fiber-reinforced composite material containing reinforcing fibers and the resin composition for a fiber-reinforced composite material and as essential components.

The present invention further relates to a fiber-reinforced resin molding containing reinforcing fibers and a cured product of the resin composition for a fiber-reinforced composite material as essential components.

The present invention further relates to a method for producing a fiber-reinforced resin molding, the method including impregnating, by injection, a base material, which is composed of reinforcing fibers and disposed in a mold, with the resin composition for a fiber-reinforced composite material, and then curing the resin composition by an in-situ polymerization reaction.

Advantageous Effects of Invention

According to the present invention, it is possible to provide a resin composition for a fiber-reinforced composite material which has excellent fluidity and the excellent impregnation in a fiber base material and which imparts excellent heat resistance and high strength to a cured product, a cured product thereof, a fiber-reinforced composite material which imparts excellent heat resistance and strength to a molding, a fiber-reinforced resin molding having excellent heat resistance and strength, and a method for producing the fiber-reinforced resin molding with good productivity.

Therefore, by using the resin composition for a fiber-reinforced composite material of the present invention, a higher cycle rate can be achieved in a method for producing CFRP and glass fiber-reinforced thermosetting plastics (GFRP), and a fiber-reinforced resin molding having excellent heat resistance and strength can be produced.

DESCRIPTION OF EMBODIMENTS

The present invention is described in detail below.

A resin composition for a fiber-reinforced composite material of the present invention contains, as thermosetting resin components, a poly(glycidyloxyaryl) compound (A), a polymerizable monomer (B) which is an unsaturated carboxylic acid or an anhydride thereof and has a molecular weight of 160 or less (hereinafter abbreviated as an "acid group-containing polymerizable monomer (B)"), an aromatic vinyl compound or a (meth)acrylate (C), and a radical polymerization initiator (D) at a predetermined ratio. A fiber reinforcing material is impregnated with the composition and then reacted at a time, i.e., both a reaction between a glycidyloxy group and an acid group and a polymerization reaction of a radical polymerizable group are simultaneously or continuously performed without being particularly distinguished as reaction steps. Therefore, while fluidity before curing is significantly increased, the heat resistance and mechanical strength of a cured product can be significantly improved by during through the in-situ polymerization reaction. Further explaining this point in detail, in the present invention, the viscosity of vanish which is the resin composition for a fiber-reinforced composite material can be significantly decreased by adapting curing system of the in-situ polymerization reaction, and thus, for example, a higher-cycle RTM method can be realized. On the other hand, the cured product obtained by the in-situ polymerization reaction can be further increased in heat resistance and improved in mechanical strength as compared with a case where the poly(glycidyloxyaryl) compound (A) and the acid group-containing polymerizable monomer (B) are previously reacted to form a vinyl ester, followed by radical polymerization. Consequently, excellent fluidity is exhibited before curing, and unconventional heat resistance and mechanical strength are exhibited after curing.

The present invention is characterized by realizing a curing system by the in-situ polymerization reaction using, as an epoxy resin component, commonly used poly(glycidyloxyaryl) compound such as a bisphenol epoxy resin or novolac epoxy resin. In particular, in producing a large molding, it is difficult to industrially use a large amount of a special epoxy resin such as an aliphatic epoxy compound. Therefore, it is a significant point that as in the present invention, in spite of using of a commonly used epoxy resin, high fluidity and high strength and high heat resistance after curing were given.

The poly(glycidyloxyaryl) compound (A) used herein is, specifically, an epoxy resin having, in its molecular structure, a glycidyloxyaryl structure produced by glycidyl-etherifying a polyhydric phenol compound or a phenol resin. Examples thereof include bisphenol epoxy resins such as bisphenol A epoxy resins, bisphenol F epoxy resins, bisphenol S epoxy resins, bisphenol AD epoxy resins, and the like; novolac epoxy resins such as ortho-cresol novolac epoxy resins, phenol novolac epoxy resins, naphthol novolac epoxy resins, bisphenol A novolac epoxy resins, brominated phenol novolac epoxy resins, alkylphenol novolac epoxy resins, bisphenol S novolac epoxy resins, alkoxy group-containing novolac epoxy resins, brominated phenol novolac epoxy resins, and the like; and other epoxy resins such as phenol aralkyl epoxy resins (commonly named "epoxy compounds of Xylok resin"), resorcin diglycidyl ether, hydroquinone diglycidyl ether, catechol diglycidyl ether, biphenyl epoxy resins, tetramethylbiphenyl epoxy resins, sulfur-containing epoxy resins, bifunctional epoxy resins such as stilbene epoxy resins, triglycidyl isocyanurate, triphenylmethane epoxy resins, tetraphenylethane epoxy resins, dicyclopentadiene-phenol addition reaction-type epoxy resins, biphenyl-modified novolac epoxy resins (epoxy compounds of polyhydric phenol resins each containing phenol nuclei connected through a bismethylene group), alkoxy group-containing novolac epoxy resins, alkoxy group-containing phenyl aralkyl resins, tetrabromobisphenol A epoxy resins, brominated phenol novolac epoxy resins, and the like. These epoxy resins may be used alone or as a mixture of two or more.

Among these epoxy resins, the bisphenol epoxy resins or the novolac epoxy resins are particularly preferred from the viewpoint that the epoxy resins have low viscosity and excellent impregnation into reinforcing fibers, and cured products have a good physical property balance between heat resistance and strength. As the bisphenol epoxy resins, those having an epoxy equivalent of 500 g/eq. or less are preferred particularly from the viewpoint of excellent fluidity at normal temperature and good impregnation into reinforcing fibers, and particularly the bisphenol A epoxy resins are preferred from the viewpoint that cured products have a good balance between rigidity and moisture and heat resistance. The epoxy equivalent of the bisphenol epoxy resins is particularly preferably in the range of 100 to 300 g/eq. in view of fluidity of the composition.

On the other hand, as the novolac epoxy resins, those having a melt viscosity at 150° C. in the range of 0.1 to 40 dPa·s are particularly preferred in view of good fluidity of the composition. In the present invention, the melt viscosity at 150° C. is a value of ICI viscosity (150° C.) measured according to "ASTM D4287". Among the novolac epoxy resins, an epoxy resin produced by reacting an ortho-cresol novolac resin or phenol novolac resin with epihalohydrin is particularly preferred from the viewpoint of fluidity.

In the present invention, as described above, the bisphenol epoxy resin or novolac epoxy resin can be preferably used as the poly(glycidyloxyaryl) compound (A). In the present invention, the bisphenol epoxy resin or novolac epoxy resin may be combined with another epoxy resin according to purposes. However, in this case, the ratio of another epoxy resin is 5 to 80 parts by mass relative to 100 parts by mass of the bisphenol epoxy resin or novolac epoxy resin from the viewpoint that the performance of the bisphenol epoxy resin or novolac epoxy resin can be sufficiently exhibited.

In the present invention, among the bisphenol epoxy resin and the novolac epoxy resin, the bisphenol epoxy resin, particularly the bisphenol epoxy resin having an epoxy equivalent of 500 g/eq. or less, is particularly preferred from the viewpoint that the composition exhibits excellent fluidity and very high heat resistance and mechanical strength.

Next, the polymerizable monomer (B) which has a molecular weight of 160 or less and which is an unsaturated carboxylic acid or an anhydride thereof used in the present invention reacts with the poly(glycidyloxyaryl) compound (A) and polymerizes at acryloyl groups by radical polymerization. In the present invention, curing by the in-situ reaction can significantly improve the heat resistance of a cured product. Specifically, the unsaturated carboxylic acid (B) is preferably selected from the group consisting of acrylic acid, methacrylic acid, maleic acid, fumaric acid, crotonic acid, itaconic acid, and anhydrides thereof from the viewpoint of the significant effect of improving fluidity of the composition.

In particular, from the viewpoint of the effect of decreasing viscosity and the excellent heat resistance of the cured product, acrylic acid and methacrylic acid are preferred, and methacrylic acid is particularly preferred.

Next, the aromatic vinyl compound or (meth)acrylate (C) (hereinafter abbreviated as the "radical polymerization polymer (C)") used in the present invention is an essential component for decreasing the viscosity of the resin composition for a fiber-reinforced composite material and exhibiting excellent curability. In the radical polymerization polymer (C), examples of the aromatic vinyl compound include styrene, methylstyrene, halogenated styrene, and divinylstyrene.

On the other hand, as the (meth)acrylate, various monofunctional (meth)acrylates and polyfunctional (meth)acrylates can be used. Examples of the monofunctional (meth) acrylates include (meth)acrylates having substituents such as methyl, ethyl, propyl, butyl, 3-methoxybutyl, amyl, isoamyl, 2-ethylhexyl, octyl, isooctyl, nonyl, isononyl, decyl, isodecyl, dodecyl, tridecyl, hexadecyl, octadecyl, stearyl, isostearyl, cyclohexyl, benzyl, methoxyethyl, butoxyethyl, phenoxyethyl, nonylphenoxyethyl, glycidyl, dimethylaminoethyl, diethylaminoethyl, isobornyl, dicyclopentanyl, dicyclopentenyl, dicyclopentenyloxyethyl, and the like.

Examples of the polyfunctional (meth)acrylates include di(meth)acrylates of 1,3-butylene glycol, 1,4-butanediol, 1,5-pentanediol, 3-methyl-1,5-pentanediol, 1,6-hexanediol, neopentyl glycol, 1,8-octanediol, 1,9-nonanediol, tricyclodecane dimethanol, ethylene glycol, polyethylene glycol, propylene glycol, dipropylene glycol, tripropylene glycol, polypropylene glycol, and the like; di(meth)acrylate of tris(2-hydroxyethyl)isocyanurate; a diol di(meth)acrylate produced by adding 2 moles or more of ethylene oxide or propylene oxide to 1 mole of 1,6-hexanediol; a diol di(meth)acrylate produced by adding 4 moles or more of ethylene oxide or propylene oxide to 1 mole of neopentyl glycol; a diol di(meth)acrylate produced by adding 2 moles of ethylene oxide or propylene oxide to 1 mole of bisphenol A; a triol di- or tri(meth)acrylate produced by adding 3 moles or more of ethylene oxide or propylene oxide to 1 mole of trimethylolpropane; a diol di(meth)acrylate produced by adding 4 moles or more of ethylene oxide or propylene oxide to 1 mole of bisphenol A; trimethylolpropane tri(meth)acrylate; pentaerythritol tri (meth)acrylate; pentaerythritol tetra(meth)acrylate; dipentaerythritol poly(meth)acrylate; ethylene oxide-modified phosphoric acid (meth)acrylate; ethylene oxide-modified alkylated phosphoric acid (meth)acrylate; and the like.

Among these, styrene, methylstyrene, halogenated styrene, divinylbenzene, monofunctional (meth)acrylates are preferred from the viewpoint that the viscosity of vanish can be further decreased. In particular, styrene or the monofunctional (meth)acrylates, particularly styrene, is preferred from the viewpoint of excellent compatibility with the poly(glycidyloxyaryl) compound (A) and significant decrease in viscosity.

The poly(glycidyloxyaryl) compound (A), the polymerizable monomer (B) which is an unsaturated carboxylic acid or an anhydride thereof and which has a molecular weight of 160 or less, and the aromatic vinyl compound or (meth)acrylate (C), which are described above in detail, are mixed at such a ratio that the equivalent ratio [glycidyloxy group/acid group] of glycidyloxy group in the poly(glycidyloxyaryl) compound (A) to acid group in the component (B) is 1/1 to 1/0.48, and the molar ratio [(B)/(C)] of the polymerizable monomer (B) having a molecular weight of 160 or less to the aromatic vinyl compound or (meth)acrylate (C) is in the range of 1/0.55 to 1/2. When the equivalent ratio [glycidyloxy group/acid group] is smaller than 1/1 (excess of the acid group over the glycidyloxy group), the remaining component (B) acts as a plasticizer and thus decreases heat resistance. On the other hand, when the equivalent ratio [glycidyloxy group/acid group] is larger than 1/0.48 (smaller amount of acid group), crosslinking is not sufficiently produced, and thus heat resistance is not sufficiently exhibited. On the other hand, when the molar ratio [(B)/(C)] is higher than 1/0.55 (larger amount of component (B)), a cured product has low heat resistance due to low curability. On the other hand, when the molar ratio [(B)/(C)] is lower than 1/2 (smaller amount of component (B)), the effect of improving heat resistance is low.

The radical polymerization initiator (D) used in the present invention may be any polymerization initiator as long as it is used as a thermal radical polymerization initiator. Examples thereof include methyl ethyl ketone peroxide, methylcyclohexanone peroxide, methylacetoacetate peroxide, acetylacetone peroxide, 1,1-bis(tert-butylperoxy)3,3,5-trimethylcyclohexane, 1,1-bis(tert-hexylperoxy)cyclohexane, 1,1-bis(tert-hexylperoxy)3,3,5-trimethylcyclohexane, 1,1-bis(tert-butylperoxy)cyclohexane, 2,2-bis(4,4-di-tert-butylperoxycyclohexyl)propane, 1,1-bis(tert-butylperoxy)cyclododecane, n-butyl 4,4-bis(tert-butylperoxy)valerate, 2,2-bis(tert-butylperoxy)butane, 1,1-bis(tert-buylperoxy)-2-methylcyclohexane, tert-butyl hydroperoxide, P-menthane hydroperoxide, 1,1,3,3-tetramethylbutyl hydroperoxide, tert-hexyl hydroperoxide, dicumyl peroxide, 2,5-dimethyl-2,5-bis(tert-butylperoxy)hexane, α,α'-bis(tert-butylperoxy)diisopropylbenzene, tert-butylcumyl peroxide, di-tert-butyl peroxide, 2,5-dimethyl-2,5-bis(tert-butylperoxy)hexyne-3, isobutyryl peroxide, 3,5,5-trimethylhexanoyl peroxide, octanoyl peroxide, lauroyl peroxide, cinnamoyl peroxide, m-toluoryl peroxide, benzoyl peroxide, diisopropyl peroxydicarbonate, bis(4-tert-butylcyclohexyl)peroxydicarbonate, di-3-methoxybutyl peroxydicarbonate, di-2-ethylhexyl peroxydicarbonate, di-sec-butyl peroxydicarbonate, di(3-methyl-3-methoxybutyl)peroxydicarbonate, di(4-t-butylcyclohexyl)peroxydicarbonate, α,α'-bis(neodecanoylperoxy) diisopropylbenzene, cumyl peroxyneodecanoate, 1,1,3,3,-tetramethylbutyl peroxyneodecanoate, 1-cyclohexyl-1-methylethyl peroxyneodecanoate, tert-hexyl peroxyneodecanoate, tert-butyl peroxyneodecanoate, tert-hexyl peroxypivalate, tert-butyl peroxypivalate, 2,5-dimethyl-2,5-bis(2-ethylhexanoylperoxy)hexane, 1,1,3,3-tetramethylbutylperoxy-2-ethyl hexanoate, 1-cyclohexyl-1-methylethylperoxy-2-ethyl hexanoate, tert-hexylperoxy-2-ethyl hexanoate, tert-butylperoxy-2-ethyl hexanoate, tert-butyl peroxyisobutylate, tert-butyl peroxymaleic acid, tert-butyl peroxylaurate, tert-butylperoxy-3,5,5-trimethyl hexanoate, tert-butylperoxyisopropyl monocarbonate, t-butylperoxy-2-ethylhexyl monocarbonate, 2,5-dimethyl-2,5-bis(benzoylperoxy)hexane, tert-butyl peroxyacetate, tert-hexyl peroxybenzoate, tert-butyl peroxy-m-toluoryl benzoate, tert-butyl peroxybenzoate, bis(tert-butylperoxy) isophthalate, tert-butylperoxyally monocarbonate, 3,3',4,4'-tetra(tert-butylperoxycarbonyl)benzophenone, and the like. The radical polymerization initiator (D) is preferably contained at a ratio of 0.001% by mass or more and 5% by mass or less relative to the total mass of the radical polymerizable components and the radical polymerization initiator (D).

The resin composition for a fiber-reinforced composite material of the present invention may further appropriately contain a reaction catalyst for reacting the poly(glycidyloxyaryl) compound (A) and the acid group-containing polymerizable monomer (B). Examples of the reaction catalyst include tertiary amines such as triethylamine, N,N-benzyldimethylamine, N,N-dimethylphenylamine, N,N-dimethylaniline, and diazabicyclooctane; quaternary ammonium salts such as trimethylbenzyl ammonium chloride, triethylbenzyl ammonium chloride, methyltriethyl ammonium chloride, and the like; phosphines such as triphenylphosphine, tributylphosphine, and the like; imidazoles such as 2-methylimidazole, 1,2-dimethylimidazole, 2-ethyl-4-methylimidazole, and the like; triphenylstibine; anion exchange resins; and the like. The amount of the catalyst used in the resin composition for a fiber-reinforced composite material, which is vanish, is preferably in the range of 0.01% to 5% by mass, particularly 0.05% to 3% by mass, in view of excellent reactivity.

The above-detailed resin composition for a fiber-reinforced composite material of the present invention may further contain a flame retardant from the viewpoint of imparting flame retardancy to a cured product. Examples of the flame retardant used include halogen-based flame retardants such as poly(brominated diphenyl ether), poly(brominated biphenyl), tetrabromobisphenol A, tetrabromobisphenol A epoxy resins, and the like; and non-halogen-based flame retardants such as phosphorus-based flame retardants, nitrogen-based flame retardants, silicone-based flame retardants, inorganic flame retardants, organic metal salt-based flame retardants, and the like. Among these, the non-halogen flame retardants are particularly preferred because of the recent high requirement for the non-halogen type.

If required, various compounding agents such as a silane coupling agent, a release agent, an ion trapping agent, a pigment, and the like can be added to the resin composition for a fiber-reinforced composite material of the present invention.

The resin composition for a fiber-reinforced composite material of the present invention can be easily prepared as a liquid composition by uniformly stirring the above-described components.

The resin composition for a fiber-reinforced composite material of the present invention can be prepared as vanish with using no organic solvent or using a very small amount of organic solvent. Examples of the organic solvent include acetone, methyl ethyl ketone, toluene, xylene, methyl isobutyl ketone, ethyl acetate, ethylene glycol monomethyl ether, N,N-dimethylformamide, methanol, ethanol, and the like. The amount of the organic solvent used is preferably 10% by mass or less in the composition, and particularly substantially no organic solvent is preferably used.

The resin composition for a fiber-reinforced composite material of the present invention, i.e., vanish for impregnation of reinforcing fibers, has high fluidity and exhibit excellent heat resistance after curing as compared with usual vanish. However, viscosity (E-type viscometer) at a temperature condition for impregnating reinforcing fibers and curing, particularly a temperature condition for molding by the RTM method, is preferably 500 mPa·s or less. In the present invention, from the viewpoint of significantly exhibiting this performance, the vanish produced by uniformly mixing the above-described components preferably has a viscosity of 500 mPa·s or less, specifically 5 to 500 mPa·s, which is measured with an E-type viscometer ("TV-20 type" cone-plate type, manufactured by Toki Sangyo Co., Ltd.) at 25° C. after the elapse of 1 hour from preparation of the vanish. Since the vanish of the present invention has such lower viscosity than usual vanish for CFRP, the heating temperature for impregnating a fiber reinforcement with the vanish can be suppressed to be low, or impregnation can be performed at the normal temperature range of 5° C. to 40° C. Further, the vanish has excellent storage stability and thus is slightly thickened and can maintain a viscosity condition of 5 to 500 mPa·s at 25° C. even after the elapse of 1 week from the preparation of the vanish. On the other hand, it is a significant point that a molding produced by impregnating the fiber reinforcement with the vanish having such low viscosity and curing by the in-situ polymerization reaction has strength not inferior to conventional CFRP moldings and is rather significantly improved in heat resistance. From the viewpoint of significantly exhibiting this characteristic performance of the present invention, the viscosity is particularly preferably 300 mPa·s or less, and particularly when a bisphenol epoxy resin having an epoxy equivalent of 500 g/eq. or less is used, the viscosity is preferably 200 mPa·s or less. In this case of using a bisphenol epoxy resin having an epoxy equivalent of 500 g/eq. or less, even when the viscosity is adjusted to a very low value of 200 mPa·s or less, a cured product and molding having excellent heat resistance and strength can be produced.

As described above, the cured product of the resin composition for a fiber-reinforced composite material of the present invention is produced by the in-situ polymerization reaction. Here, as described above, the in-situ polymerization reaction represents that both the reaction between the glycidyloxy group and the acid group and the polymerization reaction of radical polymerizable group are simultaneously or continuously performed without being particularly distinguished as separate reaction steps.

Specifically, the curing temperature for the in-situ polymerization reaction is preferably in the temperature range of 50 to 250° C., and particularly preferably, curing is performed at 50 to 100° C. to form a tack-free cured product, followed by further treatment under a temperature condition of 120° C. to 200° C.

In addition, a fiber-reinforced composite material of the present invention contains the above-described resin composition for a fiber-reinforced composite material and reinforcing fibers as essential components, and specifically the fiber-reinforced composite material is produced by impregnating a reinforcing base material composed of reinforcing fibers with the vanish prepared by uniformly mixing the components, i.e., the resin composition for a fiber-reinforced composite material.

Therefore, the cured product is produced by impregnating a reinforcing base material composed of reinforcing fibers with the resin composition for a fiber-reinforced composite material and then performing the in-situ polymerization reaction.

Herein, the reinforcing fibers may be any one of a twist yarn, an untwisted yarn, and a zero-twist yarn, but the untwisted yarn and the zero-twist yarn are preferred because both moldability and mechanical strength of a fiber-reinforced plastic member are satisfied. Further, as a form of the reinforcing fibers, fibers aligned in one direction or a fabric can be used. The fabric can be freely selected from a plain fabric, a satin fabric, and the like according to the place and purpose of use. Specifically, carbon fibers, glass fibers, aramid fibers, boron fibers, alumina fibers, silicon carbide fibers, and the like can be used because of excellent mechanical strength and durability. These may be used in combination of two or more types. Among these, the carbon fibers or the glass fibers are particularly preferred from the viewpoint of good strength of a molding. As the carbon fibers, various types such as polyacrylonitrile-based, pitch-based, and rayon-based fibers can be used. In particular, the polyacrylonitrile-based carbon fibers are preferred because high-strength carbon fibers can be easily produced. On the other hand, a glass soft mat, a glass cloth, a strong cloth, and the like can be used as the glass fibers.

In addition, in producing the fiber-reinforced composite material by impregnating the reinforcing base material composed of the reinforcing fibers with the vanish, the amount of the reinforcing fibers used is preferably such that the volume content of the reinforcing fibers in the fiber-reinforced composite material is in the range of 40% to 85%.

A fiber-reinforced resin molding of the present invention is a molding including reinforcing fibers and a cured product of the resin composition for a fiber-reinforced composite material, and specifically the amount of the reinforcing fibers in the fiber-reinforced resin molding is preferably in the range of 40 to 85%, particularly from the viewpoint of strength, in the range of 50 to 70%, in terms of volume content.

Examples of a method for producing the fiber-reinforced resin molding include a hand lay-up method or spray-up method including spreading a fiber aggregate in a mold and then laminating the vanish in multiple layers; a vacuum impregnation method (VaRTM method) in which a base material composed of reinforcing fibers is stacked while being impregnated with the vanish using one of male and female molds to form a molded product, and the molded product is covered with a flexible mold capable of applying pressure to the molded product, airtight-sealed, and then vacuum (reduced-pressure)-molded; a SMC press method in which the vanish containing reinforcing fibers is formed into a sheet and then compression-molded with a mold; a RTM method including injecting the vanish into a combined mold having a fiber bed; and a method including producing a prepreg by impregnating reinforcing fibers with the vanish and then baking the prepreg in a large autoclave. Among these methods, the RTM method and the VaRTM method can be preferably applied to the present invention in view of excellent fluidity of the vanish.

A specific example of the method for producing the fiber-reinforced resin molding by the RTM method is a method in which a base material composed of reinforcing fibers is disposed in a mold and impregnated with the resin composition for a fiber-reinforced composite material by injecting the resin composition, followed by curing by the in-situ polymerization reaction.

Examples of the base material composed of reinforcing fibers include a fabric, a knit, a mat, and a blade, which are composed of reinforcing fibers. Any one of these materials may be further laminated, shaped, and fixed by means such as a binder or stitching and used as a preform.

In addition, a closed mold made of a material such as iron, steel, aluminum, FRP, wood, gypsum, or the like can be used as the mold.

The fiber-reinforced resin molding produced by the RTM method is preferably produced by a vacuum RTM molding method including reducing the pressure in a cavity of the mold in which the base material composed on reinforcing fibers is disposed, and injecting the resin composition for a fiber-reinforced composite material into the cavity by way of a differential pressure between the reduced pressure in the cavity and external pressure to impregnate the base material with the resin composition. Specifically, the method includes shaping the base material composed of reinforcing fibers along the mold surface of a lower mold, clamping the base material with the upper and lower molds, reducing the pressure in the cavity of the mold, impregnating the base material with the resin composition for a fiber-reinforced composite material, and then in-situ curing the resin composition under the above-described curing temperature condition. In this case, before the base material composed of reinforcing fibers is disposed on the mold surface of the lower mold, a gel coating is preferably applied to the mold surface from the viewpoint of good appearance of the molding. After curing, the intended fiber-reinforced resin molding can be obtained by removal from the mold. In the present invention, after the removal from the mold, post-curing may be further performed at a higher temperature.

In addition, besides the reinforcing fiber base material, a foam core, a honeycomb core, or a metal component may be disposed in the mold to produce a composite material integrated with this member. In particular, a sandwich structure produced by disposing carbon fiber base materials on both sides of the foam core and then molding is useful as, for example, an outside plate material for an automobile or an aircraft, because it is lightweight and has large flexural rigidity.

On the other hand, a specific example of the method for producing the fiber-reinforced resin molding by the vacuum impregnation method (VaRTM method) is a method in which the reinforcing fiber base material is laminated on either the male mold or the female mold and is further covered with a plastic film, and the vanish is injected under vacuum pressure attained by vacuum suction to impregnate the reinforcing fiber base material with the vanish, and is then cured by the in-situ polymerization reaction.

The vacuum impregnation method (VaRTM method) is a RTM method, and a usable mold material is substantially the same as in the RTM method. In addition, the reinforcing fiber base material is preferably composed of carbon fibers or glass fibers from the viewpoint of strength of the resultant molding. In particular, a large blade such as a wind-power generation blade is preferably produced by the vacuum impregnation method (VaRTM method) from the viewpoint that the blade is required to have high strength and rigidity and is produced with a large area and a large thickness. In addition, reinforcing fibers for such a wind-power generation blade are preferably glass fibers in view of easy response to an increase in size of the molding. The wind-power generation blade tends to be significantly increased in size, and low viscosity and long working life of vanish are important factors for producing glass fiber-reinforced plastic (GFRP) having a low void content and high quality. The fiber-reinforced resin composition of the present invention complies with these requirements and thus is particularly suitable as a resin material for a wind-power generation blade.

Examples of application of the fiber-reinforced resin molding produced as described above include sporting goods such as a fish pole, a golf shaft, a bicycle frame, and the like; frames or body materials of automobiles and aircrafts; spacecraft members; a wind-power generation blade; and the like. In particular, an automobile member, an aircraft member, and a spacecraft member are required to have high heat resistance and strength, and thus the fiber-reinforced resin molding of the present invention is suitable as a CFRP molding for these applications, and particularly suitable for automobile members, e.g., automobile structural members such as an underbody, a monocoque, a platform, and the like; a bumper; a fender; a front door; panel members such as a door inner panel, a door outer panel, a hood panel, and the like; and interior parts such as an instrument panel and the like. Further, the fiber-reinforced resin molding can be used as members of not only gasoline automobiles but also diesel vehicles, bio-diesel vehicles, fuel-cell vehicles, hybrid vehicles, electric cars, and the like. On the other hand, the resin composition for a fiber-reinforced composite material is particularly suitable for large moldings such as a wind-power generation blade because the vanish has very excellent fluidity.

EXAMPLES

Although the present invention is specifically described below with reference to examples and comparative examples, "parts" and "%" below are on a weight basis unless otherwise specified. Each of the physical properties was measured under conditions described below.

1) Vanish viscosity: measured at 25° C. using an E-type viscometer ("TV-20 type" cone-plate type, manufactured by Toki Sangyo Co., Ltd.).

2) Softening point: measured according to "JIS K7234 (ring-and-ball method)".

3) Melt viscosity at 150° C. (ICI viscosity)

Melt viscosity at 150° C. was measured according to "ASTM D4287".

4) Melt kinetic viscosity at 60° C.

Measured at 60° C. according to "JIS K-2283".

5) Glass transition point (dynamic viscoelasticity measurement (DMA method): A cured product was cut into a width of 5 mm and a length of 50 mm with a cutter and measured with respect to dynamic viscoelasticity using "DMS6100" manufactured by SII Nanotechnology Inc. in a double cantilever bending mode within the measurement temperature range of room temperature to 260° C. at a heating rate of 3° C./min, a frequency of 1 Hz (sine wave), and a strain amplitude of 10 μm. The temperature at maximum tan δ was regarded as Tg.

6) Flexural strength and flexural elastic modulus of resin plate: according to JIS 6911

7) Flexural strength of carbon fiber-reinforced composite material: according to JIS K7074

Examples 1 to 5 and Comparative Examples 1 to 5

1. Mixing of Epoxy Resin Composition

According to each of the compositions shown in Table 1 below, an epoxy resin, a carboxylic acid, a polymerizable compound, a radical polymerization initiator, a curing promoter, etc. were mixed with a stirrer to prepare an epoxy resin composition. After the elapse of 1 hour from the preparation of the epoxy resin composition, vanish viscosity was evaluated.

2. Formation of Epoxy Resin Cured Plate

A resin cured plate was formed under curing conditions A or B below and subjected to various evaluation tests. The results are shown in Table 1. The curing conditions used in each of the examples and comparative examples are shown in Table 1.

[Curing Conditions A]

The epoxy resin composition was poured into a space of a mold including a spacer (silicone tube) having a thickness of 2 mm and held between glass plates and then cured at 170° C. for 10 minutes in an oven, and a cured product was removed from the mold to produce a resin cured plate.

[Curing Conditions B]

The epoxy resin composition was poured into a space of a mold including a spacer (silicone tube) having a thickness of 2 mm and held between glass plates and then cured at 170° C. for 1 hour in an oven, and a cured product was removed from the mold to produce a resin cured plate.

3. Preparation of Carbon Fiber-Reinforced Composite Material

Four carbon fiber fabrics (carbon fiber: C06343, fabric weight 198 g/cm$^2$, manufactured by Toray Co., Ltd.) cut into 150 mm×150 mm were stacked on a SUS sheet of 200 mm×200 mm×3.5 mm coated with polytetrafluoroethylene/perfluoroalkylvinyl ether copolymer, and the epoxy resin composition was cast and pressed with a roller to impregnate the carbon fibers with the resin composition. Further, another SUS sheet coated with polytetrafluoroethylene/perfluoroalkylvinyl ether copolymer was placed. Then, curing was performed at 100° C. for 1 hour in an oven, and then after curing was performed at 170° C. for 1 hour to produce a fiber-reinforced composite material having a thickness of 1.5 mm. According to visual observation, voids such as bubbles were not observed in the fiber-reinforced composite material. The composite material was used as a test piece for various evaluation tests. The results are shown in Table 1.

TABLE 1

| | | | Example | | | | | Comparative Example | | | | |
|---|---|---|---|---|---|---|---|---|---|---|---|---|
| | | | 1 | 2 | 3 | 4 | 5 | 1 | 2 | 3 | 4 | 5 |
| Composition | Epoxy resin (A) | BPA-type liquid epoxy resin | | 33.2 | 24.9 | 2.5 | | | | 22.6 | 18.6 | |
| | | Phenol novolac epoxy resin A | 29.5 | | | | | | | | | |
| | | Phenol novolac epoxy resin B | | | | 22.2 | | | 31 | | | |
| | | BPA novolac epoxy resin | | | | | 26.2 | | | | | |
| | | Alicyclic epoxy resin | | | | | | 25 | | | | |
| | | Polyglycidylamine | | | | | | | | | | 20 |
| | Acid group-containing polymerizable monomer (B) | Methacrylic acid | 7 | 7.6 | 11.4 | 11.5 | 10.8 | 15 | 6.5 | 12.4 | 8.6 | 12 |
| | Aromatic vinyl compound or (meth)acrylate (C) | Styrene | 13.6 | 4.6 | 6.9 | 13.9 | 13 | 10 | 13 | 15 | 22.8 | 13 |
| | | Isobornyl methacrylate | | 4.6 | 6.9 | | | | | | | |
| | Other components | Radical polymerization initiator A | 0.5 | 0.5 | 0.5 | 0.5 | 0.5 | — | — | 0.5 | 0.5 | — |
| | | Radical polymerization initiator B | — | — | — | — | — | — | 0.5 | — | — | — |
| | | 2-Methylimidazole | 0.5 | 0.5 | 0.5 | 0.5 | 0.5 | — | — | 0.5 | 0.5 | — |
| | | 2-Ethyl-4-methylimidazole | — | — | — | — | — | — | 0.5 | — | — | — |
| | | Glycerin | 0.5 | 0.5 | 0.5 | 0.5 | 0.5 | — | — | — | — | — |
| Epoxy group in component (A)/acid group in component (B) [equivalent ratio] | | | 1/0.5 | 1/0.5 | 1/1 | 1/1 | 1/1 | 1/0.9 | 1/0.46 | 1/1.2 | 1/1 | 1/0.8 |
| Component (B)/component (C) [molar ratio] | | | 1/1.6 | 1/0.7 | 1/0.6 | 1/1 | 1/1 | 1/0.45 | 1/1.7 | 1/1 | 1/2.2 | 1/1.25 |
| Composition viscosity | mPaS 25° C. | | 100 | 99 | 23 | 97 | 116 | 1 | 484 | 7 | 4 | 7 |
| Viscosity 24 hr after | | | 238 | 202 | 41 | 156 | 196 | 48 | 635 | 15 | 7 | 8 |
| Curing conditions | | | A | A | A | B | B | A | A | A | A | A |
| Physical properties of resin cured plate | DMA Tg 170° C./10 min | | 180 | 174 | 179 | 197 | 204 | 198 | 172 | 174 | 156 | 164 |
| | Flexural strength (MPa) | | 121 | 135 | 140 | 133 | 125 | 120 | 115 | 113 | 118 | 120 |
| | Flexural modulus (MPa) | | 3350 | 3210 | 3350 | 3280 | 3300 | 3800 | 3300 | 2900 | 2890 | 3370 |
| | Flexural strain (%) | | 4.2 | 5.9 | 6.1 | 4.2 | 4.3 | 2.5 | 2.8 | 3.6 | 3.5 | 4.2 |
| CFRP physical properties | Fiber mass content (%) | | 43 | 45 | 42 | 49 | 44 | 42 | 45 | 44 | 48 | 42 |
| | Flexural strength (MPa) | | 450 | 460 | 420 | 450 | 440 | 460 | 380 | 420 | 406 | 430 |

In Table 1, "A" and "B" in "Curing conditions" correspond to "Curing conditions A" and "Curing conditions B", respectively, described above.

Comparative Examples 6 to 8

According to each of the compositions shown in Table 2 below, components were mixed with a stirrer to prepare a resin composition. After 1 hour elapsed from the preparation of the resin composition, vanish viscosity was evaluated, and then after 1 week further elapsed, vanish viscosity was measured. Next, as in Example 1, the resin composition was poured into a space of a mold including a spacer (silicone tube) having a thickness of 2 mm and held between glass plates and then cured at 100° C. for 4 hours in an oven to produce a resin cured plate having a thickness of 2 mm. The resin cured plate was used as a test piece for various evaluation tests. In addition, a carbon fiber-reinforced composite material was formed by the same method as in Example 1 and evaluated. The results are shown in Table 2.

TABLE 2

| | | Comparative Example | | |
|---|---|---|---|---|
| | | 6 | 7 | 8 |
| Composition | BPF-type liquid epoxy resin | 77.5 | 77.5 | |
| | Vinyl ester resin | | | 72.5 |
| | Aromatic polyamine | 21.8 | 21.8 | |
| | Lewis acid catalyst A | 0.7 | | |
| | Lewis acid catalyst B | | 0.7 | |
| | Styrene | | | 27.5 |
| | Radical polymerization initiator A | | | 1 |
| Composition viscosity (mPaS, 25° C.) | | 23000 | 20000 | 320 |
| Viscosity 24 hr after | | Solidified | Solidified | 630 |
| Physical properties of resin cured plate | DMA Tg | 115 | 114 | 150 |
| | Flexural strength (MPa) | 138 | 121 | 117 |
| | Flexural modulus (MPa) | 3370 | 3300 | 3500 |
| CFRP physical properties | Fiber mass content (%) | — | — | 42 |
| | Flexural strength (MPa) | — | — | 350 |

The components used for the epoxy resin compositions of the examples and the comparative examples are as follows.

"BPA-type liquid epoxy resin": bisphenol A liquid epoxy resin (trade name "EPICLON 850S" manufactured by DIC Corporation, epoxy equivalent of 188 g/eq.)

"Cresol novolac epoxy resin": cresol novolac epoxy resin (trade name "EPICLON N-695" manufactured by DIC Corporation, epoxy equivalent of 212 g/eq., melt viscosity at 150° C. of 28 dPa·s, softening point of 95° C.)

"Phenol novolac epoxy resin A": phenol novolac epoxy resin (trade name "EPICLON N-740" manufactured by DIC Corporation, epoxy equivalent of 178 g/eq., melt dynamic viscosity at 60° C. of 8500 centistokes)

"Phenol novolac epoxy resin B": phenol novolac epoxy resin (trade name "EPICLON N-770" manufactured by DIC Corporation, melt viscosity at 150° C. of 4.8 dPa·s, epoxy equivalent of 186 g/eq., softening point of 68° C.)

"BPA novolac epoxy resin": bisphenol A novolac epoxy resin (trade name "EPICLON N-865" manufactured by DIC Corporation, melt viscosity at 150° C. of 2.7 dPa·s, epoxy equivalent of 208 g/eq., softening point of 67° C.)

"BPF-type liquid epoxy resin B": bisphenol F liquid epoxy resin (trade name "EPICLON 830" manufactured by DIC Corporation, epoxy equivalent of 171 g/eq.)

"Alicyclic epoxy resin": (3,4-epoxycyclohexane)-methyl-3',4'-epoxycyclohexyl carboxylate ("CELLOXIDE 2021P" manufactured by Daicel Chemical Industries, Ltd.)

"Polyglycidylamine": N,N,N',N'-tetraglycidyldiamino-diphenyl methane ("ARALDITE MY721CH" manufactured by Huntsman Advanced Materials Co., Ltd.)

"2-Ethyl-4-methylimidazole": 2-ethyl-4-methylimidazole ("CURESOLE 2E4MZ" manufactured by Shikoku Chemicals Corp.)

"Isobornyl methacrylate": isobornyl methacrylate ("LIGHT ESTER IB-X" manufactured by Kyoeisha Chemical Co., Ltd.)

"Vinyl ester resin": bisphenol A epoxy methacrylate (reaction product of "EPICLON 850S" with methacrylic acid)

"Aromatic polyamine": diethyltoluenediamine (trade name "ETHACURE-100" amine-based curing agent, manufactured by PTI Japan Co., Ltd.)

"Lewis acid catalyst A": boron trifluoride tetrahydrofuran complex

"Lewis acid catalyst B": boron trifluoride diethyl ether complex

"Radical polymerization initiator A": 1,1-di(tert-hexylperoxy)cyclohexane (polymerization initiator "PERHEXA HC" manufactured by NOF Corporation)

"Radical polymerization initiator B": cumene hydroperoxide ("PERCUMYL H-80" manufactured by NOF Corporation)

"2-Methyl imidazole": 2-methylimidazole ("CURESOLE 2MZ" manufactured by Shikoku Chemicals Corp.)

The invention claimed is:

1. A resin composition for a fiber-reinforced plastic molding, the composition comprising, as essential components, a poly(glycidyloxyaryl) compound (A) selected from the group consisting of bisphenol epoxy resins and novolac epoxy resins, a polymerizable monomer (B) selected from the group consisting of acrylic acid, methacrylic acid, and anhydrides thereof, an aromatic vinyl compound or a (meth)acrylate (C), and a radical polymerization initiator (D), wherein an equivalent ratio [glycidyloxy group/acid group] of a glycidyloxy group in the component (A) to an acid group in the component (B) is 1/1 to 1/0.48, and a molar ratio [(B)/(C)] of the component (B) to the component (C) is in the range of 1/0.55 to 1/2.

2. The resin composition for a fiber-reinforced plastic molding according to claim 1, wherein the poly(glycidyloxyaryl) compound (A) is a bisphenol epoxy resin.

3. The resin composition for a fiber-reinforced plastic molding according to claim 2, wherein the bisphenol epoxy resin has an epoxy equivalent of 500 g/eq, or less.

4. The resin composition for a fiber-reinforced plastic molding according to claim 1, wherein the poly(glycidyloxyaryl) compound (A) is a novolac epoxy resin.

5. The resin composition for a fiber-reinforced plastic molding according to claim 4, wherein the novolac epoxy resin has a melt viscosity at 150° C. of 0.1 to 40 dPa·s.

6. The resin composition for a fiber-reinforced plastic molding according to claim 1, wherein the mixing ratio of the radical polymerization initiator (D) is 0.01 to 3 parts by mass relative to the total mass of 100 parts by mass of the components (A) to (D).

7. A cured product produced by an in-situ polymerization reaction of the resin composition for a fiber-reinforced plastic molding according to claim 1.

8. A cured product produced by an in-situ polymerization reaction of the resin composition for a fiber-reinforced plastic molding according to claim 2.

* * * * *

UNITED STATES PATENT AND TRADEMARK OFFICE
CERTIFICATE OF CORRECTION

PATENT NO. : 8,487,052 B2
APPLICATION NO. : 13/389692
DATED : July 16, 2013
INVENTOR(S) : Atsuko Kobayashi et al.

It is certified that error appears in the above-identified patent and that said Letters Patent is hereby corrected as shown below:

In the Specification

Column 4, line 23, "vanish" should read --varnish--.
Column 6, line 42, "vanish" should read --varnish--.
Column 8, line 2, "vanish" should read --varnish--.
line 29, "vanish" should read --varnish--.
line 39, "vanish" should read --varnish--.
line 41, "vanish" should read --varnish--.
line 47, "vanish" should read --varnish--.
line 52, "vanish" should read --varnish--.
line 53, "vanish" should read --varnish--.
line 54, "vanish" should read --varnish--.
line 55, "vanish" should read --varnish--.
line 58, "vanish" should read --varnish--.
line 61, "vanish" should read --varnish--.
line 63, "vanish" should read --varnish--.
Column 9, line 30, "vanish" should read --varnish--.
line 59, "vanish" should read --varnish--.
Column 10, line 6, "vanish" should read --varnish--.
line 9, "vanish" should read --varnish--.
line 14, "vanish" should read --varnish--.
line 16, "vanish" should read --varnish--.
line 18, "vanish" should read --varnish--.
line 22, "vanish" should read --varnish--.
Column 11, line 6, "vanish" should read --varnish--.
line 8, "vanish" should read --varnish--.
line 24, "vanish" should read --varnish--.
line 51, "vanish" should read --varnish--.
line 60, "vanish" should read --varnish--.

Signed and Sealed this
Nineteenth Day of November, 2013

Teresa Stanek Rea
*Deputy Director of the United States Patent and Trademark Office*

CERTIFICATE OF CORRECTION (continued)
U.S. Pat. No. 8,487,052 B2

Column 12, line 26, "vanish" should read --varnish--.
Column 13, line 48, "vanish" should read --varnish--.
 line 49, "vanish" should read --varnish--.